United States Patent
Makino et al.

(10) Patent No.: US 10,436,402 B2
(45) Date of Patent: Oct. 8, 2019

(54) VEHICLE HEADLAMP

(71) Applicant: KOITO MANUFACTURING CO., LTD., Tokyo (JP)

(72) Inventors: Hiroyuki Makino, Shizuoka (JP); Takeshi Horiba, Shizuoka (JP)

(73) Assignee: KOITO MANUFACTURING CO., LTD., Minato-ku, Tokyo (JP)

( * ) Notice: Subject to any disclaimer, the term of this patent is extended or adjusted under 35 U.S.C. 154(b) by 120 days.

(21) Appl. No.: 15/117,008

(22) PCT Filed: Jan. 13, 2015

(86) PCT No.: PCT/JP2015/050623
§ 371 (c)(1),
(2) Date: Aug. 5, 2016

(87) PCT Pub. No.: WO2015/118905
PCT Pub. Date: Aug. 13, 2015

(65) Prior Publication Data
US 2017/0167683 A1     Jun. 15, 2017

(30) Foreign Application Priority Data

Feb. 6, 2014   (JP) ................ 2014-021080

(51) Int. Cl.
*F21S 41/147*   (2018.01)
*B60Q 1/068*    (2006.01)
(Continued)

(52) U.S. Cl.
CPC .......... *F21S 41/147* (2018.01); *B60Q 1/0683* (2013.01); *F21S 41/336* (2018.01); *F21S 43/145* (2018.01); *F21S 45/47* (2018.01)

(58) Field of Classification Search
CPC ...... F21S 41/323; F21S 41/334; F21S 41/335; F21S 41/336; F21S 48/1358; F21S 48/137
See application file for complete search history.

(56) References Cited

U.S. PATENT DOCUMENTS

2006/0262551 A1* 11/2006 Fallahi ................ F21V 7/04
                                                    362/518
2008/0225544 A1*  9/2008 Fujiwara ............. B60Q 1/0041
                                                    362/538
(Continued)

FOREIGN PATENT DOCUMENTS

CN      102434834 A     5/2012
JP      2011-171121 A   9/2011
(Continued)

OTHER PUBLICATIONS

English Machine Translation of JP 2013025981 provided by Espacenet.*
(Continued)

*Primary Examiner* — Zheng Song
(74) *Attorney, Agent, or Firm* — Sughrue Mion, PLLC

(57) ABSTRACT

A vehicle headlamp includes a surface light source and a reflector that forms a low beam light distribution pattern having an oblique cut-off line and a horizontal cut-off line. The surface light source is provided in a perpendicular direction with respect to an optical axis of the reflector, and the reflector forms a hot zone of the light distribution pattern by first areas with a great disposition angle and second areas with a small disposition angle where a light source image of the surface light source becomes narrow and small.

8 Claims, 9 Drawing Sheets

(51) Int. Cl.
    *F21S 41/33*    (2018.01)
    *F21S 43/145*   (2018.01)
    *F21S 45/47*    (2018.01)

(56) References Cited

U.S. PATENT DOCUMENTS

| | | | |
|---|---|---|---|
| 2010/0110714 A1* | 5/2010 | Ookubo | F21S 48/1317 362/538 |
| 2011/0199778 A1 | 8/2011 | Okubo | |
| 2011/0280028 A1 | 11/2011 | Uchida | |
| 2012/0268962 A1 | 10/2012 | Uchida et al. | |
| 2012/0314439 A1* | 12/2012 | Uchida | F21S 48/1742 362/512 |
| 2013/0188377 A1* | 7/2013 | Konishi | B60Q 1/04 362/511 |
| 2013/0314936 A1 | 11/2013 | Yamamura | |

FOREIGN PATENT DOCUMENTS

| | | |
|---|---|---|
| JP | 2011238511 A | 11/2011 |
| JP | 2012-227103 A | 11/2012 |
| JP | 2013-025981 A | 2/2013 |
| JP | 2013-243080 A | 12/2013 |
| WO | 2011/012727 A1 | 2/2011 |

OTHER PUBLICATIONS

Communication dated Oct. 27, 2017, from the Japanese Patent Office in counterpart application No. 2014-021080.
Search Report dated Mar. 3, 2015, issued by the International Searching Authority in counterpart International Application No. PCT/JP2015/050623 (PCT/ISA/210).
Written Opinion dated Mar. 3, 2015, issued by the International Searching Authority in counterpart International Application No. PCT/JP2015/050623 (PCT/ISA/237).
Communication dated Dec. 4, 2017, from the State Intellectual Property Office of People's Republic of China in counterpart Application No. 201580007548.1.
Notice of Reasons for Refusal dated Aug. 8, 2019 in corresponding Japanese Patent Application No. 2018-210180 with English translation.

\* cited by examiner

VEHICLE HEADLAMP

TECHNICAL FIELD

The present invention relates to a lamp and more particularly to a vehicle headlamp that produces a luminous intensity or light distribution by reflecting light emitted from a light source that emits light into a planar surface by a reflector.

BACKGROUND ART

In recent years, the development of vehicle headlamps employing surface light sources such as LEDs (Light Emitting Diodes) that emit light into a planar surface have been in progress. Halogen bulbs and HID (High Intensity Discharge) bulbs, constituting conventional light sources of vehicle headlamps, have an omnidirectional illumination angle (360 degrees), whereas surface light sources have a semispherical illumination angle (about 180 degrees) that is almost half the illumination angle of the conventional light sources. In some of headlamps that employ LEDs, light from a light source is reflected by a reflector whose reflecting surface is divided into a plurality of segments having different reflection properties, and projected images formed by the light source light that is reflected by the reflecting segments of the reflector are combined together so as to form a low beam light distribution pattern having an oblique and horizontal cut-off lines. For example, Japan Patent Publication No. 2012-227103 (FIGS. 1 to 7) discloses a headlamp that employs a light source that emits light into a planar surface by the use of LEDs to form a low beam light distribution pattern and in which a hot zone of the low beam light distribution pattern is formed by a central segment of a reflector, when looking at the reflector from the front thereof, and diffusing zones of the low beam light distribution pattern are formed by left and right segments of the reflector.

SUMMARY OF THE INVENTION

However, forming a low beam light distribution pattern by the use of the configuration described above poses a problem that the illuminance becomes weak near cut-off lines.

An object of the present invention is to provide a vehicle headlamp that increases the illuminance near cut-off lines of a low beam light distribution pattern to improve the far-field visibility.

With a view to achieving the object, according to the present invention, there is provided a vehicle headlamp including a surface light source that emits light into a planar surface, and a reflector that reflects light emitted from the surface light source to the front to form a low beam light distribution pattern having an oblique and horizontal cut-off lines, wherein the surface light source is provided in a perpendicular direction with respect to an optical axis of the reflector, wherein the reflector includes a plurality of segments having different reflection properties on a reflecting surface thereof, wherein in the plurality of segments, when looking at the reflector from the front thereof, a hot zone of the low beam light distribution pattern is formed by a first area that is disposed at a great disposition angle with respect to a light emitting surface of the surface light source and a second area that is disposed at a small disposition angle with respect to the light emitting surface of the surface light source, and wherein a diffusing zone of the low beam light distribution pattern is formed by a third area that is disposed at a middle disposition angle between the first area and the second area.

According to the configuration described above, the segment that is conventionally used to form the diffusing pattern is switched to the use for forming the hot zone in consideration of the property of a light source image of the light source that emits light into the planar surface (hereinafter, referred to as the surface light source), whereby the illuminance of the hot zone can be increased. Namely, being different from a point light source or a three-dimensional light source, with the surface light source, the light source image is converged to a smaller image for reflection in a position that is disposed at a smaller disposition angle with respect to the surface light source. By using the segment of the second area that lies in the position that is disposed at the small disposition angle with respect to the surface light source to form the hot zone by making use of the property of the surface light source, it is possible to project (combine) concentrically the light source image that is narrow and small and which has the high luminous intensity to the hot zone. This can increase the illuminance of the hot zone.

It is preferable that an area of the second area that illuminates mainly a subject vehicle's driving lane illuminates an area of the hot zone that includes the oblique cut-off line.

According to the configuration described above, the narrow and small light source image having the high luminous intensity which is reflected on the second area can be projected concentrically on to the area including the oblique cut-off line, thereby making it possible to increase the illuminance near the oblique cut-off line.

It is preferable that an area of the second area that illuminates mainly an oncoming vehicle's lane illuminates an area of the hot zone that includes the horizontal cut-off line.

According to the configuration described above, the narrow and small light source image having the high luminous intensity which is reflected on the second area can be projected concentrically on to the area including the horizontal cut-off line, thereby making it possible to increase the illuminance near the horizontal cut-off line.

It is preferable that at least an area of the first area that illuminates an area of the second area that includes the horizontal cut-off line and which is disposed distant from the surface light source illuminates an area of the hot zone that includes the oblique cut-off line.

In addition to the property that the light source image is converged to a smaller image for reflection in a position that is disposed at a smaller disposition angle with respect to the light source, it is also a property of the light source image of the surface light source that the light source image is converged to a smaller image for reflection in a position that is disposed more distant from the light source. According to this configuration, by making use of this property of the light source image of the surface light source, the narrow and small light source image having the high luminous intensity which is reflected in the area that is disposed more distant from the light source can be projected on to the area that includes the oblique cut-off line, thereby making it possible to increase the illuminance near the oblique cut-off line.

According to the present invention, the illuminance of the hot zone of the low beam light distribution patter, in particular, near the oblique and horizontal cut-off lines is increased, whereby the far-field visibility is improved.

DETAILED DESCRIPTION OF EMBODIMENTS

Figure 1:
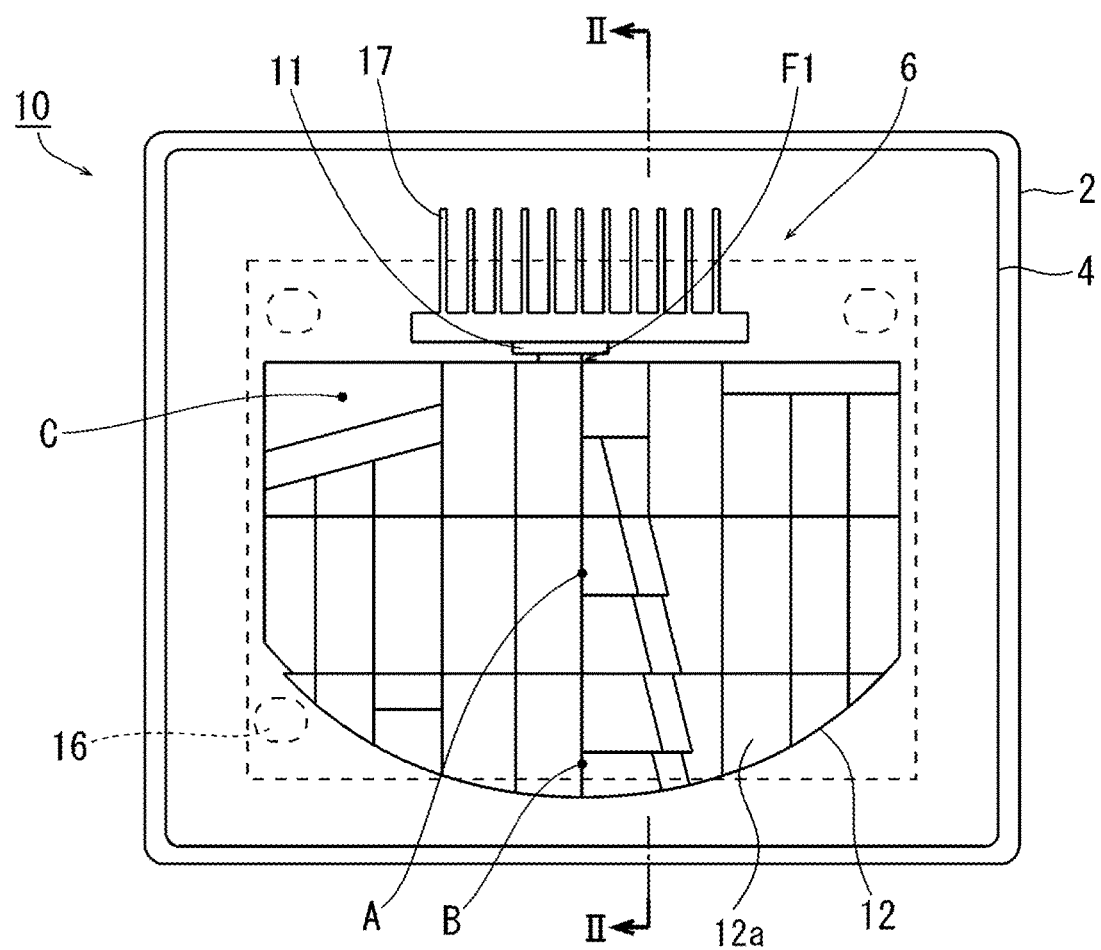
FIG. 1 is a front view of a vehicle headlamp according to an embodiment of the present invention.
Figure 2:
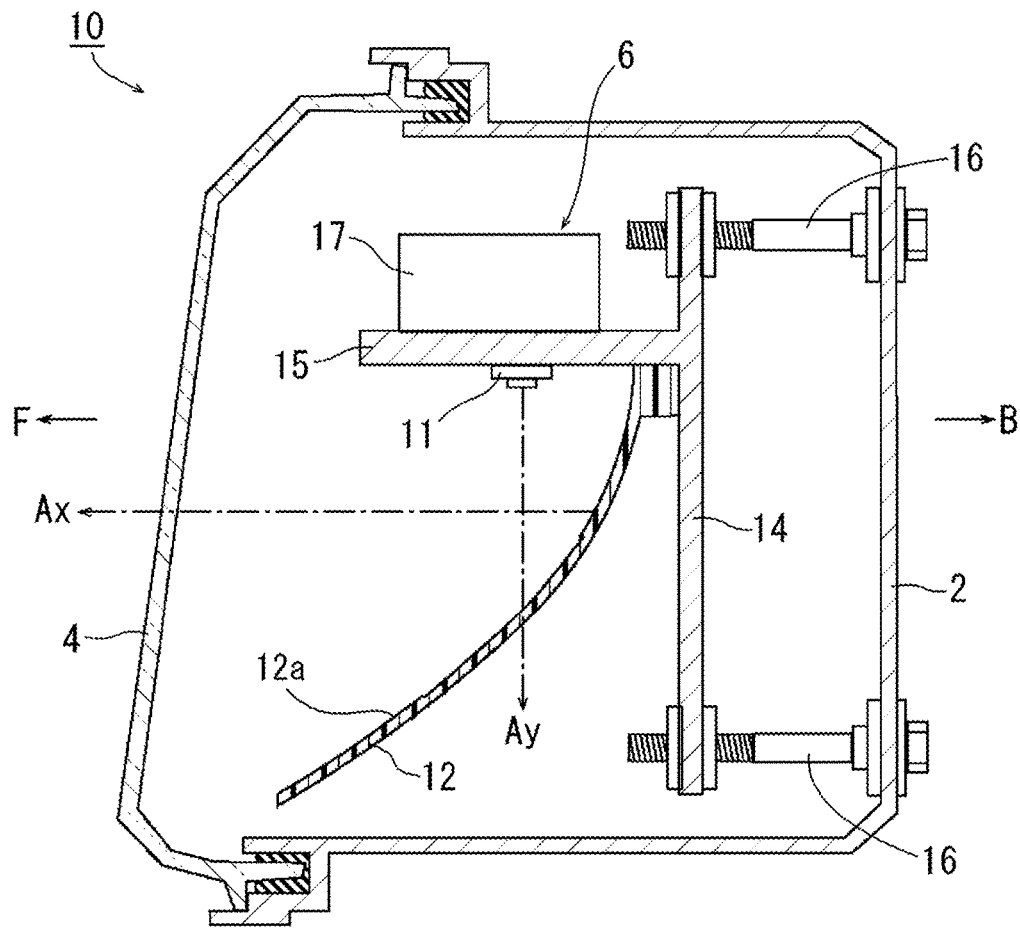
FIG. 2 is a vertical sectional view of the headlamp shown in FIG. 1.

Next, a preferred embodiment of the present invention will be described by reference to the drawings. FIG. 1 is a front view of a vehicle headlamp 10 according to an embodiment of the present invention, and FIG. 2 is a vertical sectional view (a sectional view taken along a line II-II in FIG. 1) of the headlamp 10.

The vehicle headlamp 10 has a box-shaped lamp body 2 having an opening portion and a front cover 4 formed of a transparent material of resin or glass and mounted on the opening portion. The vehicle headlamp 10 has a lump unit 6 in a lamp compartment that is defined by the lamp body 2 and the front cover 4. Vehicle headlamps 10 are provided individually at left and right front portions of a vehicle, and the configuration of the headlamp 10 which will be described below is common on the left and right headlamps 10. As shown in FIG. 2, in this description, the direction of the front cover 4 denotes the front (an arrow F), and the direction of the lamp body 2 denotes the rear (an arrow B).

The lamp unit 6 has a surface light source 11 that emits light into a planar surface, a reflector 12, and a vertical support plate 14 and a horizontal support plate 15 that make up a support member that supports the surface light source 11 and the reflector 12. An extension (not shown) is provided in front of the lamp unit 6 in the lamp compartment so as to extend over an area excluding a light emitting area of the lamp unit 6 so as to conceal the configuration of the lamp unit 6 when the headlamp 10 is seen from the front thereof.

The vertical plate 14 is fixed to the lamp body 2 with aiming screws 16 at three locations in a corner portion and is allowed to tilt vertically and horizontally. The horizontal support plate 15 is fixed to a front surface of the vertical support plate 14. The surface light source 11 is mounted on a lower surface of the horizontal support plate 15. The horizontal support plate 15 is made of metal such as aluminum having a high thermal conductivity. A heat dissipating fin 17 is formed integrally on an upper surface of the horizontal support plate 15 and functions as a heat sink. This allows heat generated by the surface light source 11 to be dissipated with good efficiency via the heat dissipating fin 17.

Figure 3:
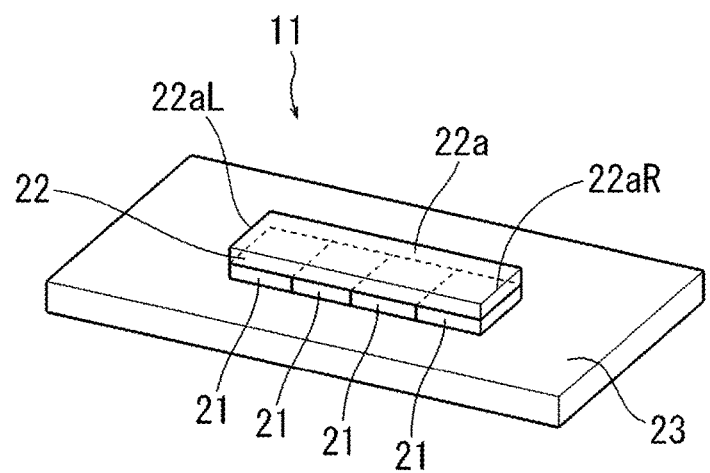
FIG. 3 is a perspective view of a surface light source.

FIG. 3 is a perspective view of the surface light source 11. The surface light source 11 has a plurality of LED chips 21 and a luminescent material 22 that are mounted on a substrate 23 of aluminum nitride. The surface light source 11 is a light emitting module that can emit light into a planar surface. Four LED chips 21 each measuring 1 mm square are arranged into a row. Blue LEDs that emit blue light are mainly adopted for the LED chips 21. The luminescent material 22 is applied rectilinearly on the LED chips 21. As the luminescent material 22 a substance is adopted which converts blue light into yellow light in terms of wavelength. When the LED chips 21 emit light, blue light emitted by the LED chips 21 and yellow light produced by the luminescent material 22 through the wavelength conversion are mixed together, whereby while light is emitted from a surface of the luminescent material 22. Namely, the surface light source 11 has a light emitting surface (the surface of the luminescent material) 22a that emits light into a rectangular shape. The surface light source 11 has an illumination angle of 180 degrees with respect to a direction in which the light emitting surface 22a is oriented. The value of this illumination angle does not have to be 180 degrees strictly and hence may be a value around 180 degrees. The LED chips 21 may emit light other than blue light such as an ultraviolet ray. The number and shape of the LED chips 21 that are described above represent the examples, and therefore, the LED chips 21 should be arranged into a form that can emit light into a planar surface. Since the luminescent material 22 is known, a detailed description thereof will be omitted here.

The reflector 12 is an optical member having a reflecting surface 12a that is formed based on a paraboloidal configuration. The reflector 12 reflects light emitted by the surface light source 11 to the front to form a low beam light distribution pattern PL, which will be described later. A proximal end portion of the reflector 12 is attached to the lower surface of the horizontal support plate 15 and the front surface of the vertical support plate 14. Namely, the surface light source 11 is provided in a vertical direction with respect to an optical axis Ax of the reflector 12 (refer to FIG. 2). This statement stating the "surface light source 11 is provided in a vertical direction with respect to an optical axis Ax of the reflector 12" means that the surface light source 11 is disposed above or below the optical axis Ax of the reflector 12. Therefore, the surface light source 11 does not necessarily have to be disposed so that as shown in FIG. 2, the light emitting surface 22a of the surface light source 11 is oriented downwards and that an optical axis Ay of the surface light source 11 intersects the optical axis Ax of the reflector at right angles. Thus, the surface light source 11 may be provided so that the light emitting surface 22a of the surface light source 11 is disposed so as to be inclined in a front-to-rear direction of the lamp and that the optical axis Ay of the surface light source 11 intersects the axis Ax of the reflector obliquely.

The reflecting surface 12a of the reflector 12 is divided into a plurality of segments having different reflection properties, which will be described later. The individual segments are formed as smooth curved surfaces. The segments lying adjacent to each other are connected together via a step or a fold. The segments of the reflector 12 are divided into a first hot zone forming portion 31, a second hot zone forming portion 32, a third hot zone forming portion 33, a first diffusing zone forming portion 41 and a second diffusing zone forming portion 42, which will be described later. Projected images that are reflected on these segments are combined together to form the low beam light distribution pattern PL that will be described below.

Figure 4:
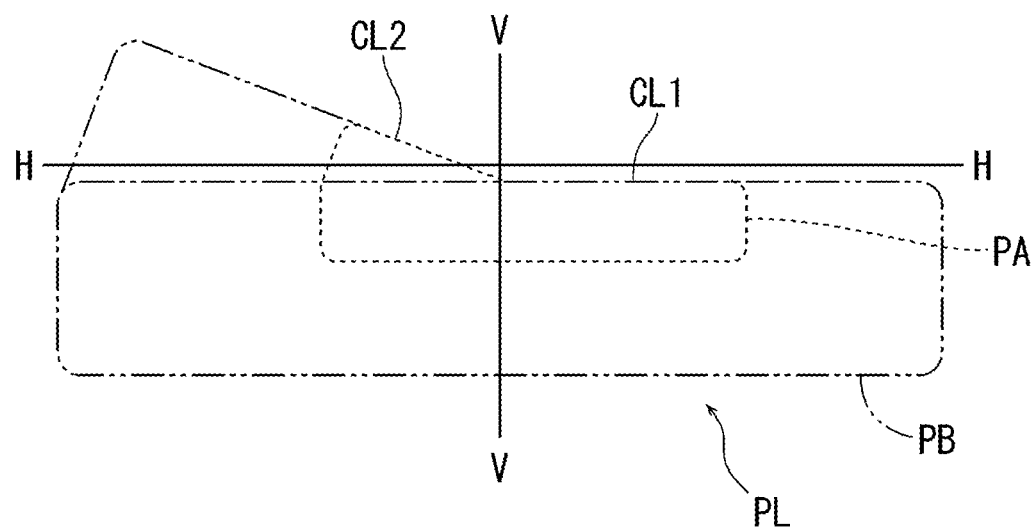
FIG. 4 shows a low beam light distribution pattern that is formed on an imaginary vertical screen by lamp units.

FIG. 4 is a diagram showing the low beam light distribution pattern PL that is formed on an imaginary vertical screen by the lamp unit 6. The lamp unit 6 forms the low beam light distribution pattern PL on the imaginary vertical screen that is erected in an imaginary position lying 25 meters ahead of the lamp unit 6 by reflecting light emitted by the surface light source 11 to the front of the lamp on the reflecting surface 12a. The low beam light distribution pattern PL has a horizontal cut-off line CL1 and an oblique cut-off line CL2. The horizontal cut-off line CL1 is a line that extends parallel to an H-H line below the H-H line on a right-hand side of a V-V line on the imaginary vertical screen. The oblique cut-off line CL2 is a line that rises obliquely to the left from a point of intersection between the horizontal cut-off line CL1 and the V-V line on the imaginary vertical screen at an angle of 15 degrees with respect to the H-H line.

The low beam light distribution pattern PL has a hot zone PA in an area lying near a vanishing point (a point of intersection of the H-H line with the V-V line) on the imaginary vertical screen. The hot zone PA includes the oblique cut-off line CL2 and the horizontal cut-off line CL1 and has a higher illuminance than that of another area (a PB area, which will be described later). The low beam light distribution pattern PL has a diffusing zone PB. The diffusing zone PB includes a horizontal area that spreads wider than the hot zone PA below the horizontal cut-off line CL1 in a left-hand side area of the V-V line and a horizontal area that spreads wider than the hot zone PA below the H-H line in a right-hand side area of the V-V line. Further, the diffusing zone PB spreads as far as an extended area from the oblique cut-off line CL2 above the H-H line. The low beam light distribution pattern PL is formed by combining the hot zone PA and the diffusing zone PB together.

Hereinafter, the configuration of the reflecting surface 12a of the reflector 12, which constitutes the gist of this patent application, will be described in detail.

Figure 5:
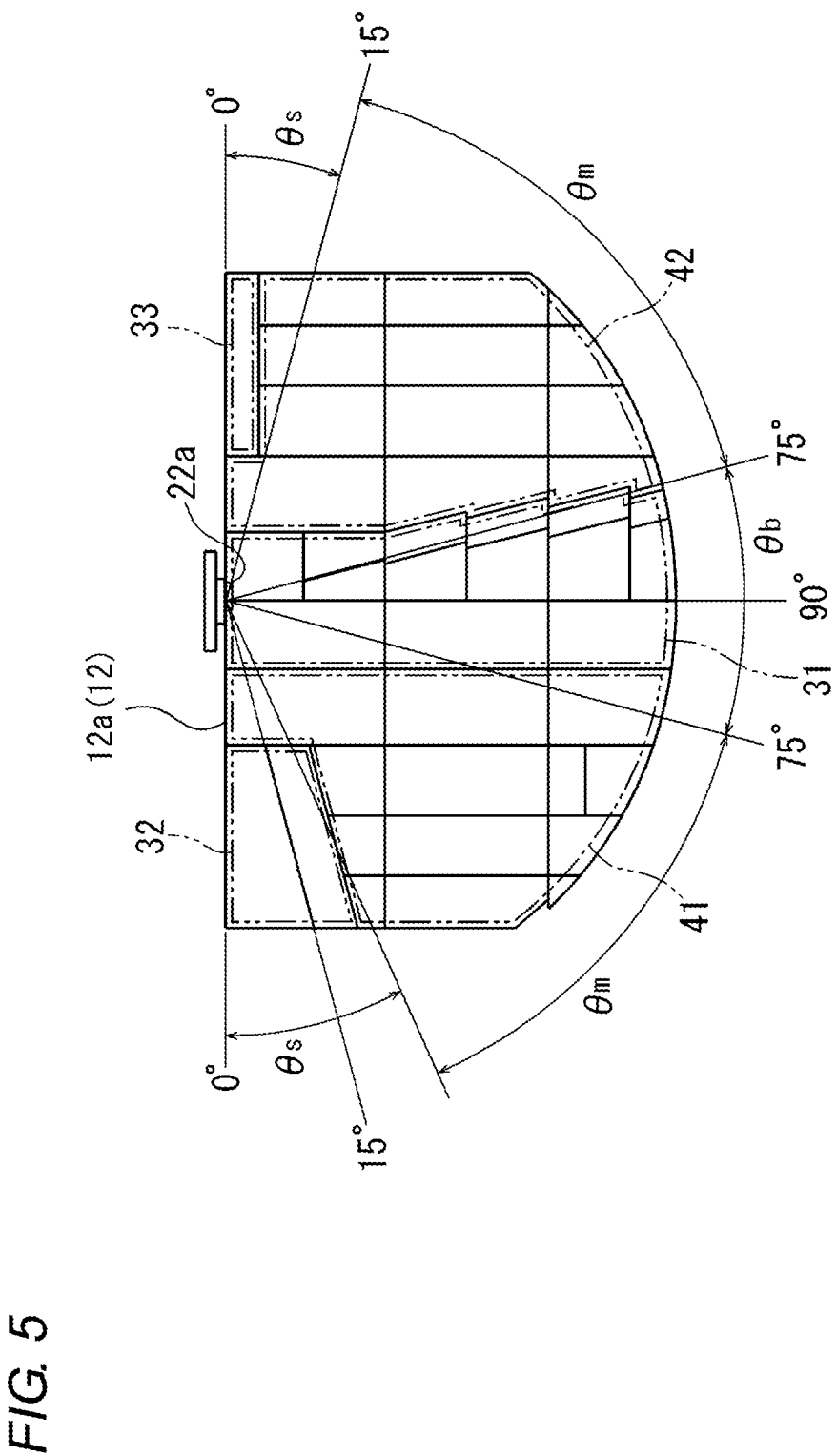
FIG. 5 is a front view of a reflector explaining the configuration of a reflecting surface.

FIG. 5 is a front view of the reflector 12 that explains the configuration of the reflecting surface 12a. When looking at the reflector 12 from the front thereof, the reflecting surface 12a of the reflector 12 has a first area θb with a great disposition angle θ with respect to the light emitting surface 22a of the surface light source 11, a second area θs with a small disposition angle θ with respect to the light emitting surface 22a, and a third area θm with a middle disposition angle with respect to the light emitting surface 22a.

Here, in this description, the disposition angle θ is expressed as 0°≤θ≤90° with a line that extends so as to pass through a reference point in a longitudinal direction of the light emitting surface 22a denoting a horizontal reference of 0 degree and a line that intersects the light emitting surface 22a at right angles at the reference point denoting an angle of 90 degrees, when looking at the reflector 12 from the front thereof and taking a center of the light emitting surface 22a of the surface light source 11 as the reference point. Namely, the disposition angle θ is defined both in a left-hand side area and a right-hand side area on the reflecting surface 12a with respect to the 90-degree line as a boundary. Consequently, the second area θs with the small disposition angle, the third area θm with the middle disposition angle and the first area θb with the great disposition angle exist in pair on the left- and right-hand side areas of the reflecting surface 12a of the reflector.

A first hot zone forming portion 31 is formed over the first areas θb with the great disposition angle, that is, in the neighborhood of the disposition angle of 90 degrees to the left and right, preferably, in an area spreading from a disposition angle in the neighborhood of a disposition angle of 75 degrees to an opposite disposition angle in the neighborhood of an opposite disposition angle of 75 degrees across the disposition angle of 90 degrees (to an angle in the neighborhood of an angle of 15 degrees away to the left and right from the 90-degree line).

The second area θs with the small disposition angle is an area lying in the neighborhood of the disposition angle of 0 degree on each of the left- and right-hand side areas, preferably, in an area ranging from the disposition angle of 0 degree to a disposition angle in the neighborhood of a disposition angle of 15 degrees on each of the left- and right-hand side areas. A second hot zone forming portion 32 is formed in the left-hand side second area θs, and a third hot zone forming portion 33 is formed in the right-hand side second area θs. When used in this description, the expression, "in the neighborhood of," for example, "in the neighborhood of 15 degrees" should not be construed as it meaning being strictly on the 15-degree line but means that it includes an area ranging more than a dozen degrees about the 15-degree line.

The third area θm with the middle disposition angle is provided between the first area θb with the great disposition angle and the second area θs with the small disposition angle on each of the left- and right-hand side areas. A first diffusing zone forming portion 41 is formed in the left-hand side third area θm, and a second diffusing zone forming portion 42 is formed in the right-hand side third area θm.

The hot zone PA is formed by the first hot zone forming portion 31, the second hot zone forming portion 32 and the third hot zone forming portion 33. The diffusing zone PB is formed by the first diffusing zone forming portion 41 and the second diffusing zone forming portion 42. In forming the first hot zone forming portion 31, the second hot zone forming portion 32 and the third hot zone forming portion 33, the whole of the first areas θb or the second areas θs do not have to be used in order to avoid the complexity in configuration of the reflector 12, hence it is preferable that the first hot zone forming portion 31, the second hot zone forming portion 32 and the third hot zone forming portion 33 are provided individually over largest areas that can be formed in the first areas θb and the second areas θs.

Here, in the configuration of the reflector of Patent Literature 1, when looking at the reflector from the front thereof, the hot zone PA is formed by the segments in the central area, that is, the first areas θb, and the diffusing zone PB is formed by the segments in the other areas, that is, the second areas θs and the third areas θm. In contrast with this configuration, in the reflector 12 of this embodiment, the second hot zone forming portion 32 and the third hot zone forming portion 33 are formed in the second areas θs, which are used to form the diffusing zone PB in the conventional example. The reason that the second areas θs are adopted to form the hot zone PA is that the properties of the light source image of the surface light source 11 should be made use of to a maximum extent. This will be described in detail below.

Figure 6A:
FIG. 6A shows a light source image of the surface light source as seen from an observing point A in FIG. 1.
Figure 6B:
FIG. 6B shows a light source image of the surface light source as seen from an observing point B in FIG. 1.
Figure 6C:
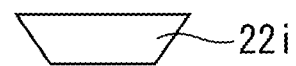
FIG. 6C shows a light source image of the surface light source as seen from an observing point C in FIG. 1.

FIG. 6A shows a light source image of the surface light source 11 as seen from an observing point A in FIG. 1, FIG. 6B shows a light source image of the surface light image 11 as seen from an observing point B in FIG. 1, and FIG. 6C shows a light source image 11 as seen from an observing point C in FIG. 1.

When looking at the surface light source 11 from the observing point A (a substantially central position on the line denoting the disposition angle of 90 degrees) in FIG. 1, the light emitting surface 22a of the surface light surface 11 (hereinafter, also referred to as a light source image 22i) looks like a rectangle as shown in FIG. 6A. In contrast with this, when looking at the surface light source 11 from the observing point B in FIG. 1 which lies more distant in the same direction from the surface light source 11 than the observing point A, the light source image 22i looks smaller in area than the light source image 22i resulting when seen from the observing point A, as shown in FIG. 6B. When looking at the surface light source 11 from the observing point C in FIG. 1 which lies almost equally distant from the surface light source 11 to the observing point A but at a smaller disposition angle θ than the observing point A with respect to the surface light source 11, the light source image 22i looks like a trapezoidal shape that is smaller in area than the light source images 22i observed from the observing points A and B, as shown in FIG. 6C.

In this way, the light source image 22i of the surface light source 11 is converged to a smaller image for reflection as the observing point lies farther from the light source 11 and at the smaller disposition angle θ with respect to the light source 11. Consequently, projecting the light source image 22i can form a projected image of high luminous intensity within a small range. With a point light source or a three-dimensional light source, the resulting light source image is not so influenced by the disposition distance and angle as influenced with the surface light source, and therefore, this is characteristic of the surface light source.

Based on this, the first hot zone forming portion 31, the second hot zone forming portion 32, the third hot zone forming portion 33, the first diffusing zone forming portion 41 and the second diffusing zone forming portion 42 will be described in detail below.

The area of the first diffusing zone forming portion 41 is divided into segments of four columns arranged in a left-to-right direction and three rows arranged in an up-to-down direction within the area of the first diffusing zone forming portion 41. The third segment from the left and top is divided further into two segments. As a result, the first diffusing zone forming portion 41 has 13 segments (refer to FIG. 5). The individual segments of the first diffusing zone forming portion 41 form a projected image that spreads to the left below the H-H line on the imaginary vertical screen.

The area of the second diffusing zone forming portion 42 is divided into segments of four columns arranged in the left-to-right direction and three rows arranged in the up-to-down direction within the area of the second diffusing zone forming portion 42. As a result, the second diffusing zone forming portion 42 has 12 segments (refer to FIG. 5). The individual segments of the second diffusing zone forming portion 42 form a projected image that spreads to the right below the H-H line on the imaginary vertical screen. The projected image of the first diffusing zone forming portion 41 and the projected image of the second diffusing zone forming portion 42 are combined together to form the diffusing zone PB. A detailed description of the light distributions that form the diffusing zone PB will be omitted here since they are described in Patent Literature 1.

Figure 7A:
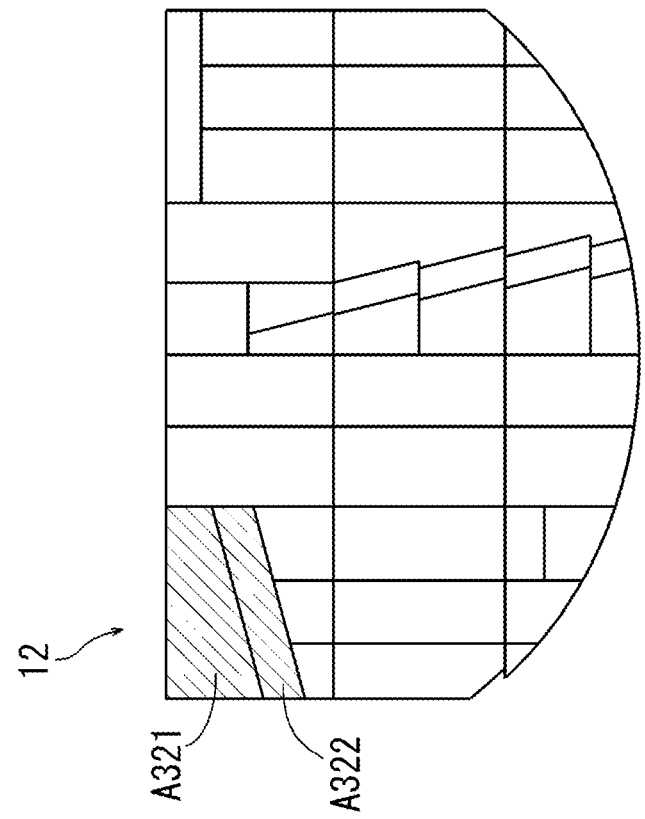
FIG. 7A is a schematic diagram showing schematically segments that are included in a second hot zone forming portion.
Figure 7B:
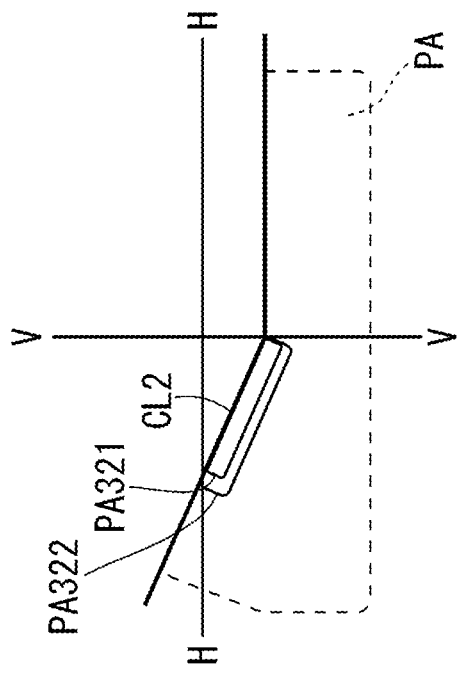
FIG. 7B is a diagram showing hot zone light distribution patterns that are formed on the imaginary vertical screen by the segments shown in FIG. 7A.

FIG. 7A is a schematic diagram showing schematically segments A321, A322 that are included in the second hot zone forming portion 32, and FIG. 7B is a diagram showing hot zone light distribution patterns PA321, PA322 that are formed on the imaginary vertical screen by the segments A321, A322 shown in FIG. 7A.

A segment A321 having a trapezoidal shape is formed in an area of the second hot zone forming portion 32 that is defined by the line denoting the disposition angle of 0 degree and the line denoting the disposition angle of 15 degrees. The trapezoidal segment A321 has an oblique side that is substantially parallel to the line denoting the disposition angle of 15 degrees. A segment A322 having a parallelogram shape is formed in an area of the second hot zone forming portion 32 that is defined by the line denoting the disposition angle of 15 degrees and a line denoting a disposition angle of 30 degrees. The parallelogram segment A322 has an oblique side that is substantially parallel to the line denoting the disposition angle of 15 degrees. The second hot zone forming portion 32 may be divided into arbitrary numbers of segments in the up-to-down direction and the left-to-right direction. To make the light distribution design easy, the second hot zone forming portion 32 may be divided into a greater number particularly in an area spreading from the disposition angle of 15 degrees to the neighborhood of the disposition angle of 30 degrees. The segments A321, A322 project light source images 22i of the surface light source 11 to form rectangular projected images PA321, PA322 within the hot zone PA. The rectangular projected images PA321, PA322 are each formed in a position where a longer side thereof substantially coincides with the oblique cut-off line CL2. By making use of the fact that the segment A321 exists in a position where the disposition angle thereof is smaller than the disposition angle of the segment A322, the segment A321 forms the projected image PA321 that is narrower than the projected image PA322.

Figure 8B:
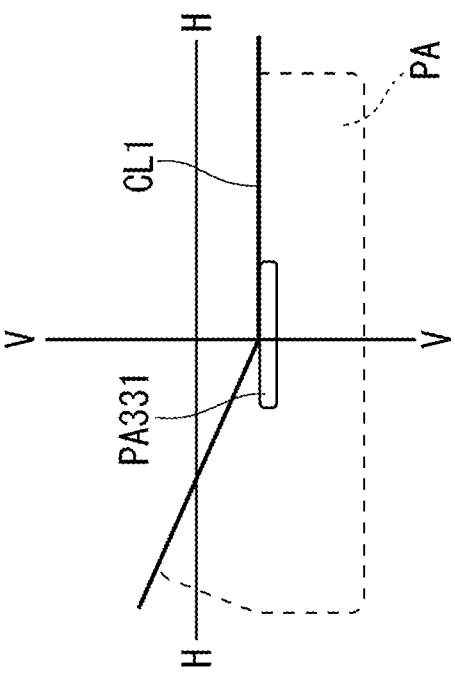
FIG. 8B is a diagram showing a hot zone light distribution pattern that is formed on the imaginary vertical screen by the segment shown in FIG. 8A.
Figure 8A:
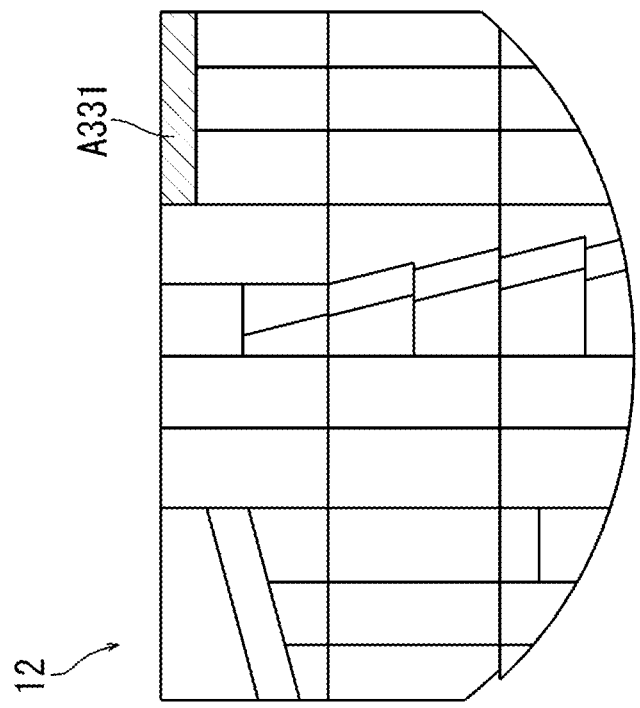
FIG. 8A is a schematic diagram showing schematically a segment that is included in a third hot zone forming portion.

FIG. 8A is a schematic diagram showing schematically a segment A331 that is included in the third hot zone forming portion 33, and FIG. 8B is a diagram showing a hot zone light distribution pattern PA331 that is formed on the imaginary vertical screen by the segment A331 shown in FIG. 8A.

A segment A331 having a rectangular shape is formed in an area of the third hot zone forming portion 33 that is defined by the line denoting the disposition angle of 0 degree and the line denoting the disposition angle of 15 degrees. The third hot zone forming portion 33 may also be divided into arbitrary numbers of segments in the up-to-down direction and the left-to-right direction. The segment A331 projects a light source image 22i of the surface light source 11 to form a rectangular projected image PA331 within the hot zone PA. The rectangular projected image PA331 is formed in a position where substantially half a longer side thereof coincides substantially with the horizontal cut-off line CL1.

Figure 9A:
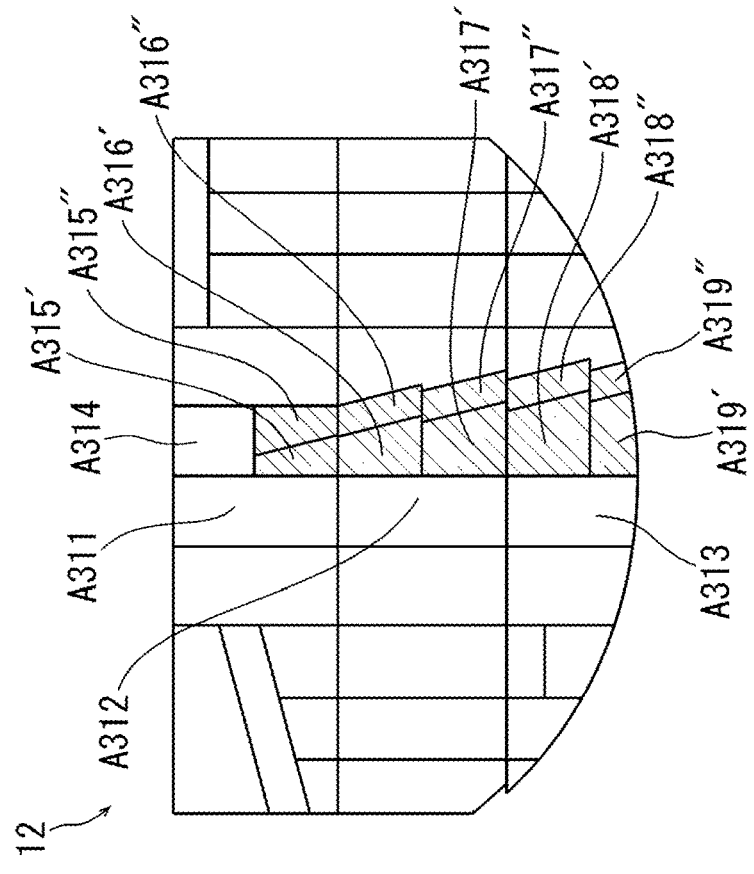
FIG. 9A is a schematic diagram showing schematically segments that are included in a first hot zone forming portion.
Figure 9B:
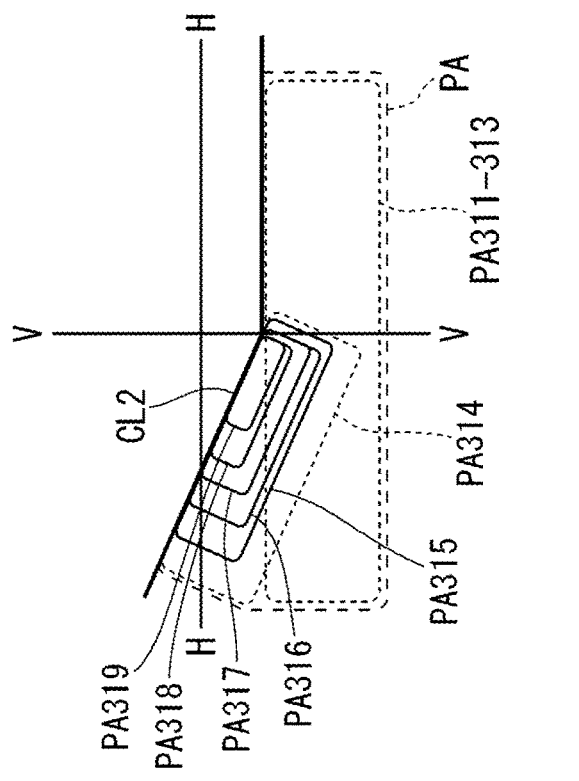
FIG. 9B is a diagram showing a hot zone light distribution pattern that is formed on the imaginary vertical screen by the segments shown in FIG. 9A.

FIG. 9A is a diagram showing schematically segments A311 to A319 that are included in the first hot zone forming portion 31, and FIG. 9B is a diagram showing schematically hot zone light distribution patterns PA311 to PA319 that are formed on the imaginary vertical screen by the segments A311 to A319 shown in FIG. 9A.

The first hot zone forming portion 31 is divided largely into two columns arranged in the left-to-right direction. Segments A311 to A313 are formed on a left area and segments A314 to A319 are formed on a right area of the first hot zone forming portion 31. The segments A311 to A313 on the left area are divided into three rows arranged in the up-to-down direction, and the segments are arranged sequentially in the order of A311, A312, and A313 from the top. The segments A314 to A319 on the right area are divided into six rows arranged in the up-to-down direction, and the segments are arranged sequentially in the order of A314, A315, A316, A317, A318, and A319 from the top. The segments A315 to A319 are divided further into two columns arranged in the left-to-right direction. Segments A315' to A319' are formed on a left-hand side, and segments A315" to A319" are formed on a right-hand side.

The segments A311 to A313 on the left area and the segment A314 on the right area are formed into rectangular shapes. The segment A315 on the right area is divided into the left segment A315' having a trapezoidal shape and the right segment A315" having a trapezoidal shape by the line denoting the disposition angle of 75 degrees (15 degrees distant from the 90-degree line). The segment A316 is divided into the left segment A316' having a trapezoidal shape and the right segment A316" having a parallelogram shape by a line denoting a disposition angle of 76 degrees (an angle in the neighborhood of 15 degrees distant from the 90-degree line). The segment A317 is divided into the left segment A317' having a trapezoidal shape and the right segment A317" having a parallelogram shape by a line denoting a deposition angle of 78 degrees (an angle in the neighborhood of 15 degrees distant from the 90-degree line). The segment A318 is divided into the left segment A318' having a trapezoidal shape and the right segment A318" having a parallelogram shape by a line denoting a disposition angle of 80 degrees (an angle in the neighborhood of 15 degrees distant from the 90-degree line. The segment A319 is divided into the left segment A319' having a trapezoidal shape and the right segment A319" having a parallelogram shape by a line denoting a disposition angle of 82 degrees (an angle in the neighborhood of 15 degrees distant from the 90-degree line). In these segments so divided, the segments A316" to A319" spread more to surpass the hot zone forming portion of Patent Literature 1 towards the diffusing zone forming portion. The first hot zone forming portion 31 may also be divided into arbitrary numbers of segments in the up-to-down direction and the left-to-right direction. The division of the segments A315 to A319 into the left segments and the right segments is made to make the light distribution design easy, and left and right projected images formed by the left segments and the right segments become the same. Owing to this, in those projected images so formed, only either of the left projected images and the right projected images is shown as projected images PA315 to PA319.

The segments A311 to A313 on the left area project light source images 22i of the surface light source 11 to form a horizontal area of the hot zone PA by the projected images PA311 to PA313. The segment A314 on the right area projects a light source image 22i of the surface light source 11 to form an area that extends substantially parallel to the oblique cut-off line CL2 at the projected image PA314, among the projected image PA311. A detailed description of these light distributions will be omitted here since the light distributions are described in Patent Literature 1.

On the other hand, the segments A315 to A319 (the segments A315' to A319' and the segments A315" to A319") on the right area project light source images 22i of the surface light source 11 to form rectangular projected images PA315 to PA319 that are smaller than the projected image PA314 in the hot zone PA. The projected images PA315 to PA319 are formed in positions where one of longer sides substantially coincides with the oblique cut-off line CL2. The segments A315 to A319 form the projected images PA319, PA318, PA317, PA316 and PA315 that gets narrower and which have higher luminous intensities in that order in a direction approaching the vanishing point as the segments A315 to A319 are positioned to be disposed more distant from the surface light source 11 in that order, that is, in the order of the segments A319, A318, A317, A316 and A315 by making use of the properties of the surface light source 11.

According to the configuration that has been described heretofore, in consideration of the properties of the light source images 22i of the surface light source 11, the hot zone PA is formed by the segments A321, A322 and A331 on the second areas θs whose disposition angles from the light source are small. This enhances the illuminance of the hot zone PA.

In particular, in the second areas θs, the projected images PA321, PA322, being narrow and having the high luminous intensity, of the second hot zone forming portion 32 that illuminates mainly the subject vehicle's driving lane are projected concentrically along the oblique cut-off line CL2. This enhances the illuminance near the oblique cut-off line CL2. In addition, in the second areas θs, the projected image PA331, being narrow and having the high luminous intensity, of the third hot zone forming portion 33 that illuminates mainly the oncoming vehicle's lane is projected concentrically along the horizontal cut-off line CL1. This enhances the illuminance near the horizontal cut-off line CL1.

Further, in the first areas θb with the great disposition angle, the projected images PA315 to PA319, being narrow and having the high luminous intensity, that are formed by the segments A315 to A319 (in particular, the segments A316", A317", A318" and A319") that exist in the area lying distant from the surface light source 11 are projected concentrically along the oblique cut-off line CL2 in the area of the third hot zone forming portion 33 (the area of the second area θs that illuminates the area including the horizontal cut-off line CL1). This enhances further the illuminance near the oblique cut-off line CL2.

Here, in the reflector 12, the second hot zone forming portion 32 that lies in the position in the second areas θs which is suitable for illuminating mainly the subject vehicle's driving lane is made use of to enhance the illuminance along the oblique cut-off line CL2. Then, the third hot zone forming portion 33 that lies in the position in the second areas θs which is suitable for illuminating mainly the oncoming vehicle's lane is used use of to enhance the illuminance along the horizontal cut-off line CL1. This enables the low beam light distribution pattern to be formed according to the light distribution properties inherent in the basic configuration of the reflector 12. Owing to this, the complexity in configuration of the reflector 12 is avoided.

Figure 10:
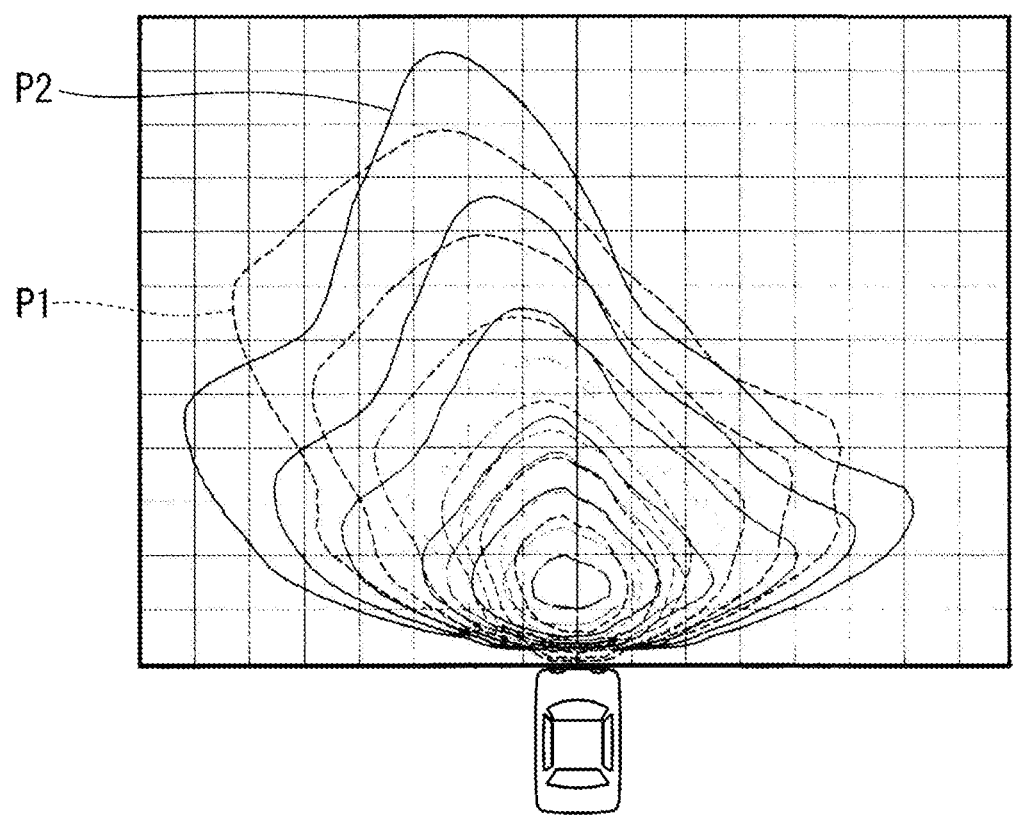
FIG. 10 is a comparison diagram that compares a light distribution produced by the embodiment of the present invention and a light distribution produced by a conventional example.

FIG. 10 is a comparison diagram that compares the light distribution produced by the embodiment of the present invention and the light distribution produced by the conventional example. FIG. 10 shows light distribution patterns formed on a horizontal road surface that are seen from thereabove. An axis of ordinate denotes a reaching distance of illumination light emitted from the vehicle headlamps. Broken lines P1 denote the light distribution obtained by the configuration of the conventional reflector of Patent Literature 1, and solid lines P2 denote the light distribution obtained by the configuration of the reflector 12 of this embodiment. According to FIG. 10, it is seen that adopting the configuration of the reflector 12 of this embodiment extends the maximum reaching distance of illumination light to thereby improve the far field visibility.

It is preferable that the surface light source 11 is disposed "transverse" so that the longitudinal direction of the light emitting surface 22a of the surface light source 11 is laid not in the front-to-rear direction of the lamp (the F-B direction) but in the left-to-right direction (the L-R direction). In the transverse arrangement, the surface light source 11 should be disposed so that a right end 22aR of the light emitting surface 22a coincides with a focal point F1 of the reflector 12 (refer to FIG. 1). This can form a projected image that follows more closely the oblique cut-off line CL2, thereby leading to the improvement in the far field visibility.

By adopting the configuration of the reflector 12 of this embodiment, the surface light source 11 can constitute the light source of the vehicle headlamp 10 alone.

In the embodiment, while the reflector 12 is described as being disposed below the surface light source 11, a configuration may be adopted in which the optical axis Ay of the surface light source 11 is caused to extend upwards, so that the reflector 12 is disposed above the surface light source 11.

While the embodiment described above is intended to form the light distribution for the left-hand traffic, the configuration described above should be reversed laterally to form a light distribution for the right-hand traffic. As this occurs, the focal point F1 of the reflector 12 should be caused to coincide with a left end 22aL of the light emitting surface 22a of the surface light source 11.

This patent application is based on Japanese Patent Application No. 2014-021080 filed on Feb. 6, 2014, the contents of which are incorporated herein by reference.

The invention claimed is:

1. A vehicle headlamp comprising:
a surface light source that emits light into a planar surface; and
a reflector that reflects light emitted from the surface light source to the front to form a low beam light distribution pattern having oblique and horizontal cut-off lines, wherein
the surface light source is provided in a perpendicular direction with respect to an optical axis of the reflector, wherein the reflector comprises a plurality of segments having different reflection properties on a reflecting surface thereof,
wherein in the plurality of segments, when looking at the reflector from the front thereof, a hot zone of the low beam light distribution pattern is formed by a first area that is disposed at a great disposition angle with respect to a light emitting surface of the surface light source and a second area that is disposed at a small disposition angle with respect to the light emitting surface of the surface light source, wherein
a diffusing zone of the low beam light distribution pattern is formed by a third area that is disposed at a middle disposition angle between the first area and the second area, and wherein
an area of the second area that illuminates mainly a subject vehicle's driving lane illuminates an area of the hot zone including illuminating an area along the oblique cut-off line in a vicinity of a point of intersection of the oblique cut-off line with the horizontal cut-off line;
wherein the first area is an area spreading from a disposition angle of about 75 degrees to an opposite disposition angle of about 75 degrees across a perpendicular line from the surface light source, and the second area is an area ranging from a disposition angle of 0 degrees to a disposition angle of about 15 degrees on each of left and right hand side areas.

2. The vehicle headlamp according to claim 1, wherein an area of the second area that illuminates mainly an oncoming vehicle's lane illuminates an area of the hot zone that includes the horizontal cut-off line.

3. The vehicle headlamp according to claim 2, wherein at least an area of the first area that illuminates an area of the second area that includes the horizontal cut-off line and which is disposed distant from the surface light source illuminates an area of the hot zone that includes the oblique cut-off line.

4. The vehicle headlamp according to claim 1, wherein at least an area of the first area that illuminates an area of the second area that includes the horizontal cut-off line and which is disposed distant from the surface light source illuminates an area of the hot zone that includes the oblique cut-off line.

5. The vehicle headlamp according to claim 1, wherein an area of the second area that illuminates mainly an oncoming vehicle's lane illuminates an area of the hot zone that includes the horizontal cut-off line.

6. The vehicle headlamp according to claim 5, wherein at least an area of the first area that illuminates an area of the second area that includes the horizontal cut-off line and which is disposed distant from the surface light source illuminates an area of the hot zone that includes the oblique cut-off line.

7. The vehicle headlamp according to claim 1, wherein at least an area of the first area that illuminates an area of the second area that includes the horizontal cut-off line and which is disposed distant from the surface light source illuminates an area of the hot zone that includes the oblique cut-off line.

8. A vehicle headlamp comprising:
a surface light source that emits light into a planar surface; and
a reflector that reflects light emitted from the surface light source to the front to form a low beam light distribution pattern having an oblique cut-off line and horizontal cut-off line, wherein
the surface light source is provided in a perpendicular direction with respect to an optical axis of the reflector, wherein
the reflector comprises a plurality of segments having different reflection properties on a reflecting surface thereof,
wherein in the plurality of segments, when looking at the reflector from the front thereof, a hot zone of the low beam light distribution pattern is formed by a first area that is disposed at a great disposition angle with respect to a light emitting surface of the surface light source and a second area that is disposed at a small disposition angle with respect to the light emitting surface of the surface light source, wherein
a diffusing zone of the low beam light distribution pattern is formed by a third area that is disposed at a middle disposition angle between the first area and the second area, and wherein
a part of the plurality of segments of the second area that illuminates mainly a subject vehicle's driving lane is formed as a trapezoidal shape having an oblique side that is substantially parallel to a line denoting the disposition angle of 15 degrees and illuminates an area of the hot zone that includes the oblique cut-off line and a point of intersection of the oblique cut-off line with the horizontal cut-off line;
wherein the first area is an area spreading from a disposition angle of about 75 degrees to an opposite disposition angle of about 75 degrees across a perpendicular line from the surface light source, and the second area is an area ranging from a disposition angle of 0 degrees to a disposition angle of about 15 degrees on each of left and right hand side areas.

* * * * *